US012115565B2

(12) United States Patent
Laux et al.

(10) Patent No.: US 12,115,565 B2
(45) Date of Patent: Oct. 15, 2024

(54) METHOD AND APPARATUS FOR TREATING PARTS

(71) Applicant: Rösler Holding GmbH, Bad Staffelstein (DE)

(72) Inventors: Manuel Laux, Bamberg (DE); Denise Hiemann, Michelau (DE); Moritz Beck, Bamberg (DE); Christoph Bätz, Coburg (DE)

(73) Assignee: Rösler Holding GmbH, Bad Staffelstein (DE)

( * ) Notice: Subject to any disclaimer, the term of this patent is extended or adjusted under 35 U.S.C. 154(b) by 177 days.

(21) Appl. No.: 17/587,906

(22) Filed: Jan. 28, 2022

(65) Prior Publication Data
US 2022/0242670 A1  Aug. 4, 2022

(30) Foreign Application Priority Data

Feb. 1, 2021  (EP) .................................... 21154597

(51) Int. Cl.
| *B23C 3/00* | (2006.01) |
| *B08B 5/02* | (2006.01) |
| *B29C 64/35* | (2017.01) |
| *B29C 64/379* | (2017.01) |
| *B33Y 40/20* | (2020.01) |
| *B65G 15/08* | (2006.01) |
| *B29C 64/386* | (2017.01) |
| *B33Y 50/00* | (2015.01) |

(52) U.S. Cl.
CPC .............. *B08B 5/023* (2013.01); *B29C 64/35* (2017.08); *B29C 64/379* (2017.08); *B33Y 40/20* (2020.01); *B65G 15/08* (2013.01); *B29C 64/386* (2017.08); *B33Y 50/00* (2014.12)

(58) Field of Classification Search
None
See application file for complete search history.

(56) References Cited

U.S. PATENT DOCUMENTS

| 1,833,301 A | 11/1931 | Peik |
| 2004/0012112 A1 | 1/2004 | Davidson et al. |
| 2017/0370016 A1 | 12/2017 | Yamakawa |

FOREIGN PATENT DOCUMENTS

| CN | 102548712 A | | 7/2012 |
| DE | 2728960 A1 | | 1/1978 |
| DE | 4013913 | * | 2/1992 |
| DE | 102004055144 A1 | | 3/2006 |
| EP | 0005144 | * | 11/1979 |
| EP | 1190967 | * | 3/2002 |
| EP | 3718692 A1 | | 10/2020 |
| JP | 0890417 | * | 4/1996 |

(Continued)

OTHER PUBLICATIONS

Translation of DE4013913 by Nuessle, published Feb. 6, 1992.*

(Continued)

*Primary Examiner* — Mikhail Kornakov
*Assistant Examiner* — Ryan L Coleman
(74) *Attorney, Agent, or Firm* — Dickinson Wright PLLC

(57) ABSTRACT

To treat parts printed by means of 3D printing from the powder bed, they are inserted into a trough belt conveyor which transports and circulates the parts and in which the parts are acted on by a fluid jet during the transport.

7 Claims, 2 Drawing Sheets

(56) References Cited

FOREIGN PATENT DOCUMENTS

Figure 1:
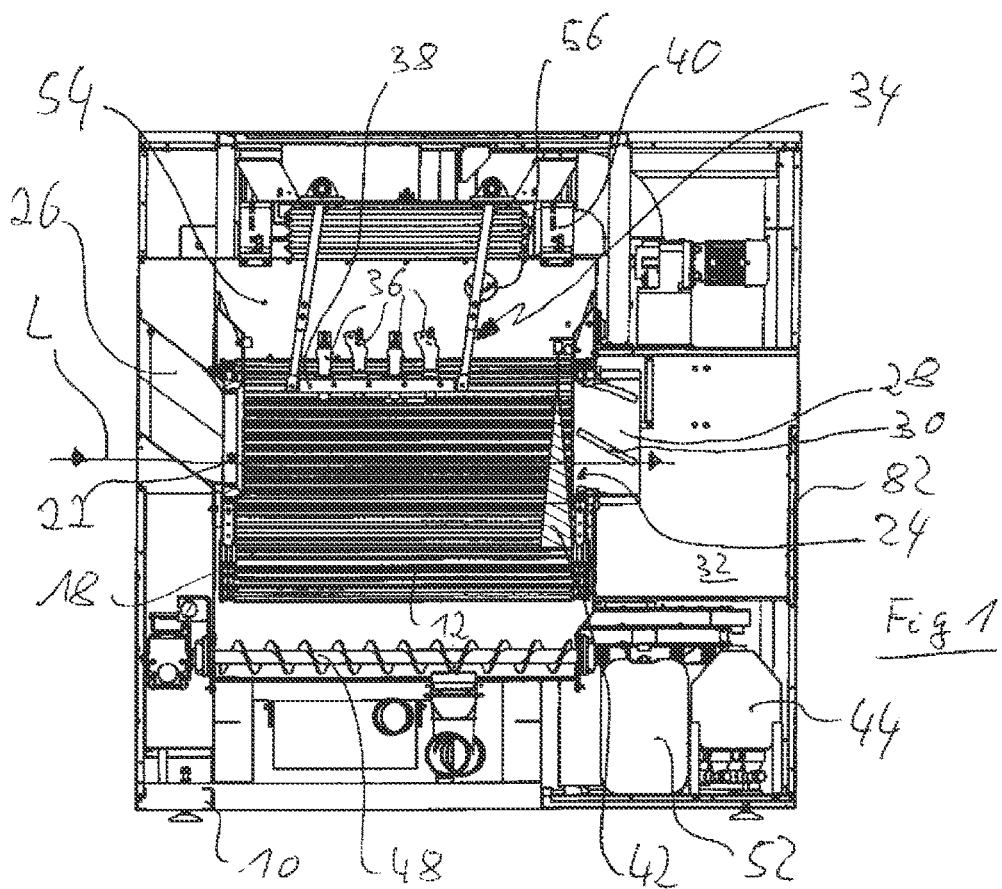

WO     WO2008128777     * 10/2008
WO     2016144593 A1     9/2016

OTHER PUBLICATIONS

Translation of JP0890417 by Nishiyama, published Apr. 9, 1996.*
Translation of EP0005144 by Neuber, published Nov. 14, 1979.*
Translation of EP1190967 by Moeller, published Mar. 27, 2002.*
Translation of WO2008128777 by Roesler, published Oct. 30, 2008.*
European Search Report mailed Jul. 23, 2021 for European Application No. 21154597.5, 12 pages.

* cited by examiner

METHOD AND APPARATUS FOR TREATING PARTS

CROSS-REFERENCES TO RELATED APPLICATIONS

This Patent Application claims the priority of European Patent Application 21154597.5, filed on Feb. 1, 2021, which is incorporated herein by reference, in its entirety.

The present invention relates to a method and an apparatus for treating parts printed by means of 3D printing from the powder bed. Such methods and apparatus are known in different embodiment variants and serve to remove (to unpack) parts produced by additive manufacturing processes from powdery residues or to otherwise treat, for example to smooth, to roughen, to de-powder, to clean, etc., parts that have already been unpacked.

In this respect, an economical and efficient operation is to be achieved, on the one hand. On the other hand, it is necessary that the parts are handled gently and are thoroughly freed from powder residues, in particular when they are small, angled, or filigree parts.

A method and an apparatus for unpacking parts are known from EP 3 718 692 A1, wherein the parts are first de-powdered by vibration in a de-powdering chamber. The parts then move via a transfer chute into a trough belt which is pivoted about its longitudinal axis and in which the parts are post-treated with the aid of a blasting device. Due to a further pivoting of the trough belt about its longitudinal axis, the parts can then be removed from the trough belt. Such a method or such an apparatus have indeed been proven in the prior art. However, for certain applications, the known method does not always lead to fully satisfactory results.

It is therefore the object of the present invention to provide a method and an apparatus for treating parts with which a treatment of parts, in particular small or filigree shaped parts, is possible in an efficient manner.

This object is satisfied by the features of the independent claims.

In the method in accordance with the invention for treating parts printed by means of 3D printing, the parts are first inserted into a trough belt of a trough belt conveyor provided with entrainers, wherein the trough belt extends in its longitudinal direction, in particular horizontally, between an inlet and an outlet. The parts are then transported in the longitudinal direction from the inlet to the outlet by moving the trough belt in a direction of revolution. In accordance with the invention, a transport of the parts therefore takes place from the inlet of the trough belt to its outlet, and indeed in the longitudinal direction through the trough belt. This has the advantage that the parts can be acted on by a fluid jet along the longitudinal extent of the total trough belt, wherein the parts are simultaneously circulated during the transport. The parts hereby do not accumulate at one and the same point, but the parts remain substantially separated during the transport and are nevertheless circulated within the trough belt and are thereby acted on by the fluid jet at all sides over a longer distance.

Since the parts are transported from the inlet of the trough belt to the outlet of the trough belt and the trough belt therefore does not have to be moved (apart from its circulation along a predefined path), the method in accordance with the invention and the corresponding apparatus are particularly well suited for a continuous operation in a continuous process in which the parts can be treated in a continuous batch flow.

Advantageous embodiments of the invention are described in the description, in the drawing, and in the dependent claims.

In a first advantageous embodiment, the fluid jet can be introduced into the interior of the trough belt conveyor or of the trough belt through at least one nozzle that can be moved to and fro in the longitudinal direction and/or transversely thereto during the action. With this procedure, the transport of the parts over the length of the trough belt is advantageously used to also move the fluid jet over the parts over a longer period of time during the transport so that a particularly targeted blasting treatment adapted to the respective parts can take place.

In accordance with a further advantageous embodiment, the fluid jet can be introduced into the interior of the trough belt conveyor or of the trough belt through at least one nozzle whose spacing from the base of the trough belt is varied during the action. In this way, the intensity of the fluid jet can be varied with respect to the parts so that a varied spacing between the nozzle and the base of the trough belt can, for example, be set in dependence on the size of the parts. In accordance with a further embodiment, an image capture apparatus can additionally be provided that, for example, detects the size, contour, or quantity of the parts in an automated manner and that subsequently controls the spacing of the nozzle from the base of the trough belt in an automated manner or also the to-and-fro movement of the nozzle in dependence on the captured image data.

In accordance with a further advantageous embodiment, during the action, an air curtain is produced transversely to the longitudinal direction in the region of the outlet and/or in the region of the inlet, wherein this air flow can in particular be ionized. It is prevented by such an air curtain that blasting medium and/or powder escapes/escape in an unwanted manner to the outside from the inlet or the outlet of the trough belt during the action.

In accordance with a further advantageous embodiment, the revolving trough belt can be held in a stationary manner in a horizontal position during the insertion of the parts and during the action. In other words, the trough belt does indeed revolve along its orbit for the transport of the parts. However, the trough belt is neither pivoted nor tilted, but is held in a stationary manner in a horizontal position, i.e. is not inclined with respect to the longitudinal direction. It is hereby ensured that the parts are transported uniformly within the trough belt without accumulating at certain points or falling over one another in an unwanted manner.

In accordance with a further advantageous embodiment, the fluid jet can include a blasting medium that is separated from powder after the action and that is used again for the action. An efficient operation can be achieved by such a return circuit.

In accordance with a further advantageous embodiment, the trough belt conveyor can be used in a closed transport circuit for the transport and the treatment of parts. A very efficient continuous operation can hereby be achieved in which single or multiple batches are continuously treated.

In accordance with a further advantageous embodiment, filigree parts can in particular be protected during the treatment in that they are inserted into a cage before the treatment, which cage then passes through the trough belt.

In accordance with a further aspect, the present invention relates to an apparatus that is in particular suitable for carrying out a method of the kind described above, wherein the apparatus comprises a trough belt conveyor having a revolving trough belt that extends in a longitudinal direction, which in particular extends horizontally, between an inlet and an outlet. The trough belt has a transport device to transport parts in the longitudinal direction from the inlet to the outlet through the trough belt conveyor and to circulate them in so doing. Such a transport device can, for example, be implemented in the form of individual entrainers that are, for example, arranged in a helical manner at the bars of the trough belt. Furthermore, the apparatus has a blasting device for applying at least one fluid jet to the parts during the transport.

In accordance with an advantageous embodiment, the apparatus can have an input chute, which is inclined downwardly with respect to the horizontal in the direction of the inlet, at the inlet of the trough belt. It is prevented by such an inlet chute that powder or blasting medium escapes from the trough belt in the direction of the inlet in an unwanted manner during the action.

In accordance with a further advantageous embodiment, a discharge chute, which is provided with guide vanes, can be provided at the outlet of the trough belt. Such guide vanes serve to prevent an accumulation of parts in the region of the discharge chute. Thus, parts that are located at the end of the trough belt, not at its base, but above the base, are guided by the guide vanes in the direction of a discharge location without falling directly onto parts disposed therebeneath.

In accordance with a further advantageous embodiment, the peripheral contour of the discharge chute can be adapted to the contour of the outlet of the trough belt. This also ensures that the parts are conveyed very gently out of the trough belt conveyor. Thus, the trough belt can, for example, have an at least predominantly circular peripheral contour and the discharge chute can, for example, be adapted to this peripheral contour by a tubular shape.

In accordance with a further advantageous embodiment, the blasting device can have at least one nozzle that is movable to and fro in the longitudinal direction and/or whose spacing from the base of the trough belt conveyor is variable during the action. The advantages described above hereby result.

In accordance with a further advantageous embodiment, the trough belt, viewed in cross-section, can be formed symmetrically with respect to a vertical that extends through a central axis of the belt trough, wherein the revolving trough belt is held in a stationary manner in the horizontal. Such a symmetrical design of the trough belt has the advantage of a compact structure and of a uniform circulation of the parts.

In accordance with a further advantageous embodiment, the total apparatus can be assembled on a transportable base frame and can have a maximum height of 2095 mm and a maximum depth of 1555 mm. A very compact apparatus is hereby provided that can, for example, be transported in a simple manner with the aid of a forklift truck or a lifting apparatus, wherein the small dimensions of the apparatus are selected such that it can be transported through a standard double door.

The present invention will be described in the following purely by way of example with reference to an advantageous embodiment and to the enclosed drawings.

Figure 2:
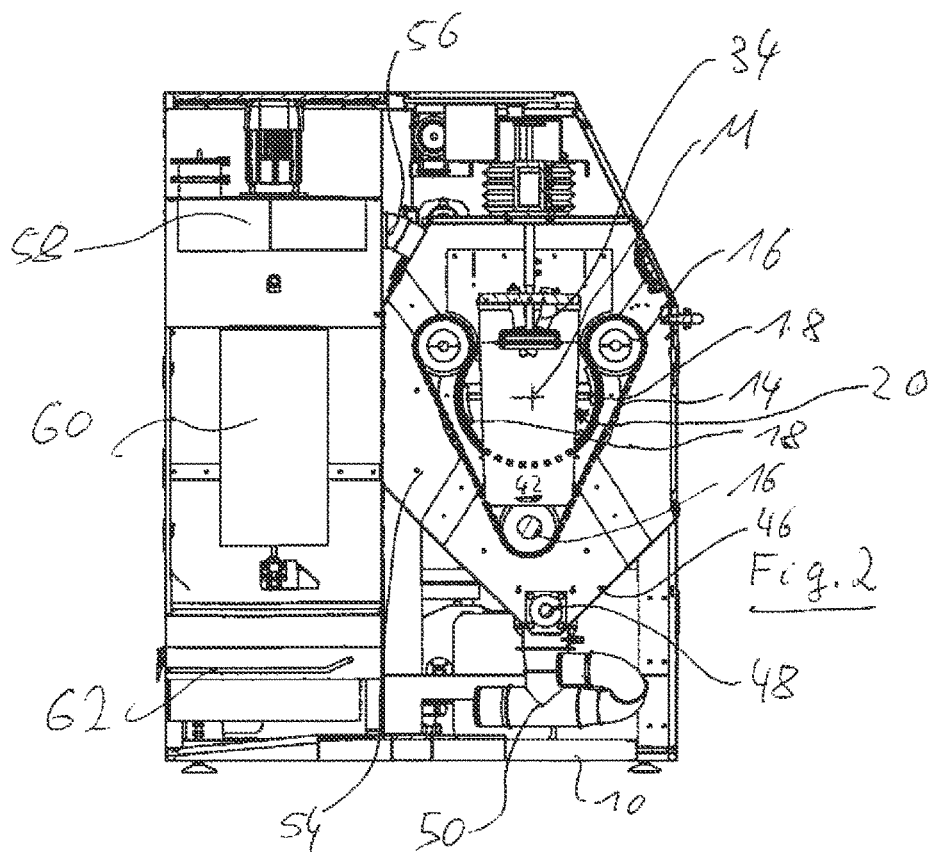
Figure 3:
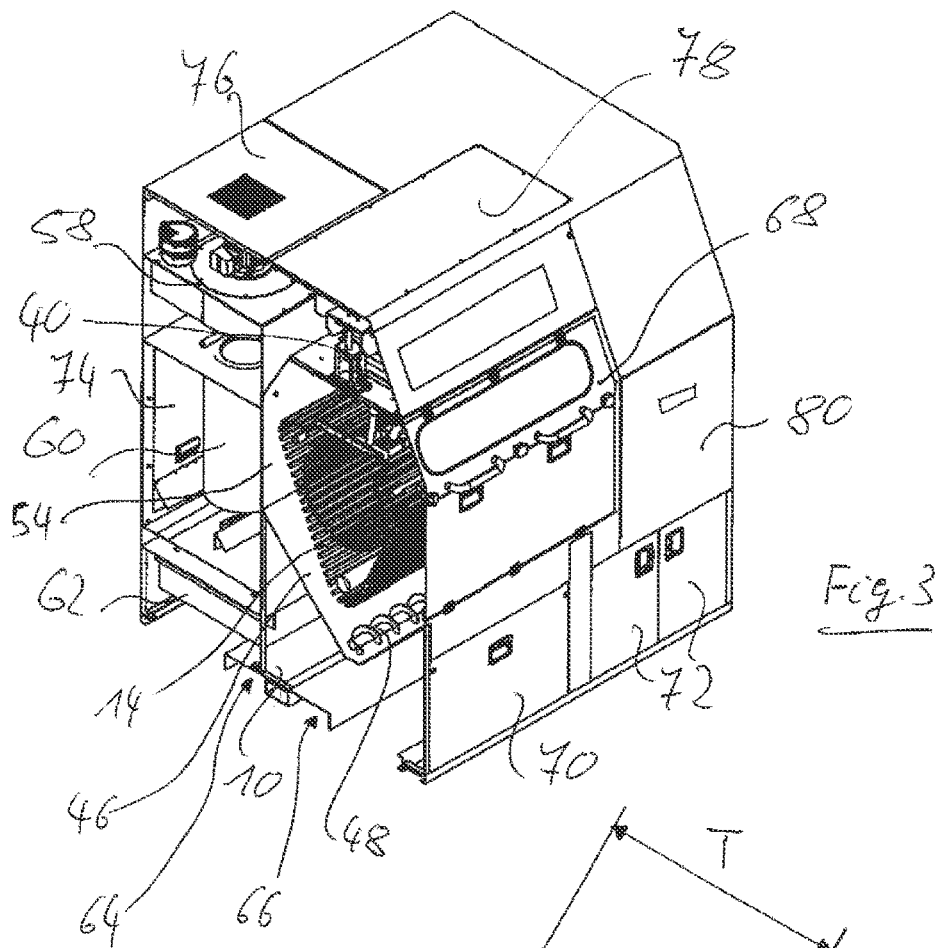

There are shown:

FIG. 1 a sectioned side view of an apparatus for treating parts;

FIG. 2 a cross-sectional view through the apparatus of FIG. 1;

FIG. 3 a sectioned perspective view of the apparatus of FIG. 1 and FIG. 2; and

Figure 4:
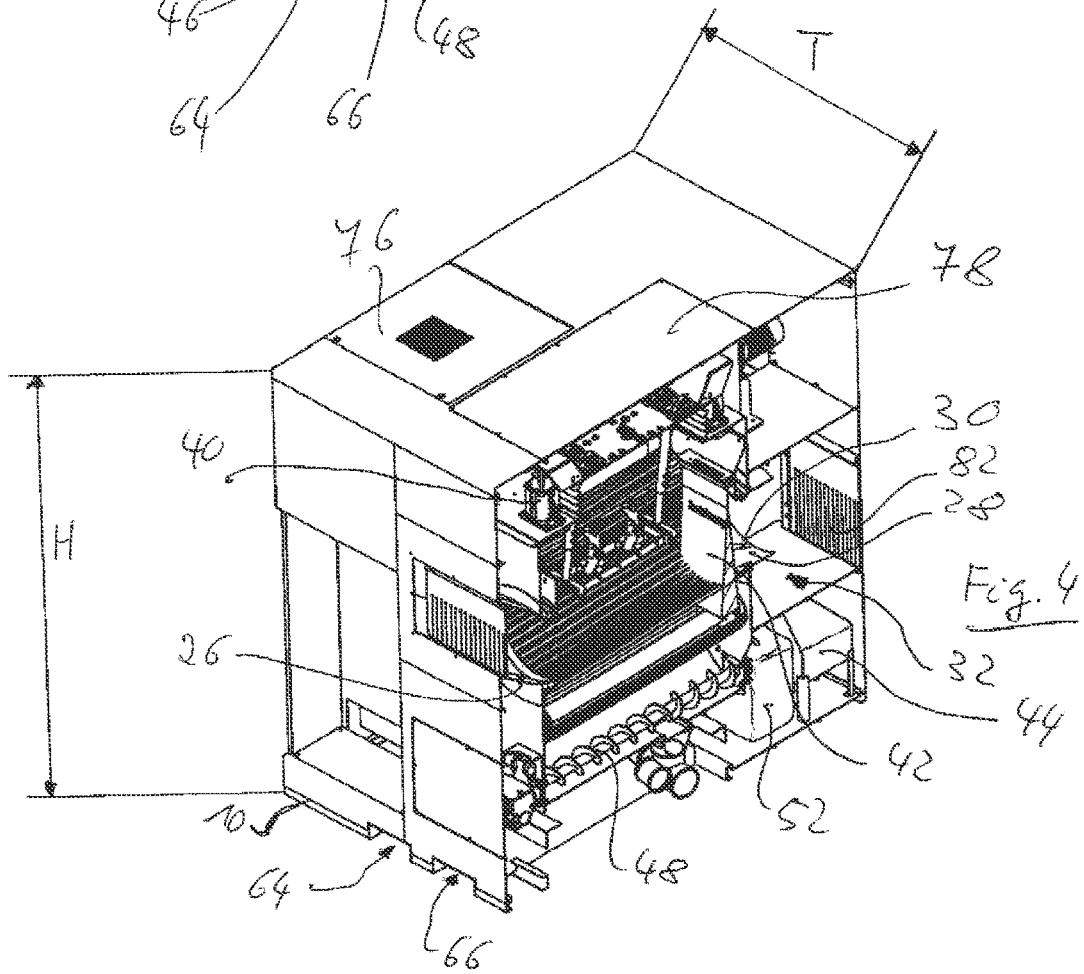

FIG. 4 a further sectioned perspective view of the apparatus of FIG. 1 to FIG. 3.

FIG. 1 shows an apparatus for treating parts that are printed by means of 3D printing, for example, for unpacking parts from a powder bed. The apparatus is assembled on a transportable base frame 10 and has a trough belt conveyor 12 having a trough belt 14 that is guided in a manner known per se via a plurality of deflection rollers 16 (FIG. 2) and guides 18 such that a belt trough 20 (FIG. 2) is formed by the trough belt 14. For this purpose, the trough belt comprises a plurality of bars which are connected in parallel with one another and at which entrainers (not shown) are located that are fastened to the outer sides of the bars so that they project into the interior of the belt trough 20 on the revolution of the trough belt. The trough belt 14 is driven in a revolving manner via a drive not shown in more detail.

As in particular FIG. 1 and FIG. 2 illustrate, the trough belt 14 extends in a horizontal and stationary manner in the longitudinal direction between an inlet 22 and an outlet 24. In the case of a revolving trough belt, parts which have been conveyed through the inlet 22 into the interior of the belt trough 20 are conveyed through the trough belt conveyor 12 in the longitudinal direction L so that the longitudinal direction L simultaneously also represents the transport direction of the parts in which said parts are conveyed from the inlet 22 to the outlet 24 through the trough belt conveyor and are circulated in so doing.

A tubular input chute 26 is provided at the inlet 22 of the trough belt 14, the peripheral contour of said tubular input chute 26 being adapted to the circular contour of the trough belt 14 in the region of the belt trough, wherein the input chute 26 is inclined downwardly with respect to the horizontal in the direction of the inlet 22. Thus, the input chute 26 extends upwardly from the inlet of the trough belt 14 against the transport direction L.

A discharge chute 28, whose peripheral contour is likewise adapted to the contour of the outlet 24 of the trough belt 14, is furthermore provided at the outlet 24 of the trough belt 14. Accordingly, the discharge chute 28 has the shape of a tubular socket whose diameter corresponds to the diameter of the belt trough 20 formed by the trough belt 14. At its inner wall, the discharge chute 28 is provided with a plurality of guide vanes 30 that are inclined downwardly in an approximately helical manner starting from the outlet 28 and that ensure that parts which have been lifted slightly by the trough belt conveyor 12 do not fall directly downwardly after leaving the trough belt conveyor 14, but are conveyed in a guided manner in the direction of a collection space 32.

As FIG. 2 illustrates, the contour of the peripheral trough belt 14, viewed in cross-section, is formed symmetrically, and indeed with respect to a vertical plane extending through a central axis M of the belt trough 20. Furthermore, the trough belt 14 can indeed revolve, but it is overall held in a stationary manner and fixed in the horizontal within the base frame 10.

In the region of the upper opening of the belt trough formed by the trough belt 14, a blasting device 34 is provided that comprises a plurality of nozzles 36 that are fastened to a longitudinal support 38. The longitudinal support 38 is again suspended in an oscillating manner and can be moved to and fro in and against the transport direction L (to the right and left in FIG. 1) by means of a drive, not shown. At the same time, the longitudinal support 38 with the nozzles 36 fastened thereto can also be lifted in the direction of the base of the trough belt 14 and against this direction by means of a lifting device 40.

Finally, the nozzles 36 at the support 38 can also have a separate drive to move said nozzles 36 to and fro, in particular transversely to the transport direction L, and/or to rotate them along a path.

In accordance with an embodiment, to control the movement of the individual nozzles or also of the support 38 in the longitudinal direction L and/or transversely thereto, a control device can be provided in the vertical that is coupled to an image capture apparatus that captures the interior of the belt trough 20. A targeted movement of the nozzles 36 can then be achieved with the aid of image recognition software to treat the individual parts with a fluid jet.

A respective air curtain 42 is provided both in the region of the inlet 22 and in the region of the outlet 24 and extends substantially over the total cross-sectional surface of the inlet or the outlet, wherein the air curtain emits ionized air that serves as a barrier to prevent an exit of powder and/or blasting medium from the region of the trough belt conveyor.

The fluid jet which is applied to the parts within the trough belt conveyor can comprise pure compressed air. However, other known blasting media such as glass beads, plastic balls, corn meal or the like can also be used. Such a blasting medium can be stored in a blasting medium storage container 44 (FIG. 4) and can be supplied to the nozzles 36 from there. To reuse the blasting medium for an application, it is collected in a collection hopper 46 (FIGS. 2 and 3) at whose base a screw conveyor 48 is provided that conveys the blasting medium into a return channel 50 that is in turn connected to a cyclone (not shown) to clean the blasting medium of powder residues. After exiting from the cyclone, the blasting medium is once again guided through a vibrating screen, wherein a subsequent blasting medium dosing with blasting medium from the blasting medium container 44 can also take place in this region. The reference numeral 52 in FIG. 1 designates a container for separated powder residues.

In the interior of the blasting chamber 54, in which the trough belt conveyor 12 is located, an air suction 56 is provided by which powder dust is sucked from the blasting chamber 54 and is fed to a filter 60 by means of a fan 58. The filter contents can be fed to a residual powder container 62 at regular intervals. The air suction can also be designed such that a suction of dust and excess blasting medium takes place from the region of the inlet and/or outlet.

As in particular FIG. 3 and FIG. 4 illustrate, the apparatus described above is extremely compact in design and has a maximum height H of 2095 mm and a maximum depth T of 1555 mm. The apparatus assembled on the base frame 10 can be transported in a simple manner by means of a forklift truck or a lift truck whose forks can be inserted into two reception openings 64 and 66 provided at the lower side. The apparatus is provided with a housing that is closed at all sides and that is provided with an access flap 68 at the front side to reach the nozzles 36 from outside. A further flap 70 is provided beneath the access flap 68 to grant access to the blasting medium recirculation and to a screen drawer. The doors 72 enable access to the residual powder container 52 and to the blasting medium storage container 44.

A further access flap 74 (FIG. 3) is provided at the rear side of the apparatus and provides access to the filter 60. An access door is also provided at the rear side, enables access to the present pneumatics and the blast hoses, and enables a screen change.

A cover 76 at the upper side of the housing enables access to the fan 58. A further cover 78 at the upper side of the housing enables a repair and maintenance of the nozzle lifting unit.

Finally, two further openings for a workpiece removal are provided in the region of the discharge hopper 28. A pivot flap 80, through which the unpacked parts can be manually removed from the front, is provided at the front side of the housing. An outlet opening 82, through which the workpieces can automatically be laterally discharged, is likewise provided at the adjacent side wall of the housing. In this way, the apparatus can be used in a closed transport circuit for a transport and the treatment of parts.

In the operation of the apparatus described above, the parts to be treated are first transported manually or automatically via the input chute 26 to the inlet 22 of the trough belt conveyor 12 whose trough belt 14 is driven in a revolving manner. The parts conveyed into the interior of the belt trough are hereby transported in the longitudinal direction L through the trough belt, and indeed from the inlet 22 to the outlet 24, wherein the parts are indeed circulated during the transport, but do not accumulate. At the same time, the parts are subjected to blasting media, which exit from the nozzles 36, by fluid jets during the transport. In this respect, the parts are treated, for example unpacked or deburred or roughened, and are removed from the region of the belt conveyor 12 via the discharge chute 28 after the passing through of the belt trough 20 through the outlet 24. The air curtains in the region of the inlet and the outlet prevent an exiting of powder dust in this respect. The nozzles 36 can be moved both in and against the transport direction L and also transversely thereto or can also be rotated. A movement of the nozzles 36 in a vertical direction is also possible. An optimized application of blasting medium to the parts can thus take place.

In the circuit, the blasting medium itself is returned and cleaned via the screw conveyor 48 and is then returned to the circuit again.

The invention claimed is:

1. An apparatus comprising a trough belt conveyor having a revolving trough belt that extends in a longitudinal direction, which extends between an inlet and an outlet of the trough belt,
wherein the trough belt has transport devices to transport parts in the longitudinal direction from the inlet to the outlet through the trough belt conveyor and to circulate them, and a blasting device for applying at least one fluid jet to the parts during the transport,
wherein the blasting device has a plurality of nozzles, said nozzles being fastened to a longitudinal support that is suspended in an oscillating manner and that can be lifted in a vertical direction, and that can be moved to and fro in the longitudinal direction, and wherein movement of the support results in movement of the nozzles fastened to the support,
wherein an image capture apparatus is provided, wherein the image capture apparatus controls a movement of the nozzles and/or of the support.

2. The apparatus in accordance with claim 1, wherein the apparatus is configured to carry out a method of treating parts printed by means of 3D printing from a powder bed, said method comprising the following steps: inserting the parts into the trough belt of the trough belt conveyor, wherein the trough belt conveyor is provided with a plurality of entrainers; transporting the parts in the longitudinal direction through the trough belt from the inlet to the outlet by moving the trough belt in a direction of revolution; and circulating the parts within the trough belt during the transport, wherein the parts are acted on by at least one fluid jet during the transport.

3. The apparatus in accordance with claim 1, wherein the revolving trough belt extends horizontally between the inlet and the outlet.

4. The apparatus in accordance with claim 1, wherein an input chute, which is inclined downwardly with respect to the horizontal in a direction of the inlet of the trough belt, is provided at the inlet of the trough belt.

5. The apparatus in accordance with claim 1, wherein a discharge chute, which is provided with guide vanes, is provided at the outlet of the trough belt.

6. The apparatus in accordance with claim 1, wherein the revolving trough belt, viewed in cross-section, is formed symmetrically with respect to a vertical extending through a central axis of the trough belt.

7. The apparatus in accordance with claim 1, wherein the apparatus is assembled on a transportable base frame and has a maximum height of 2095 mm and a maximum depth of 1555 mm.

\* \* \* \* \*